United States Patent
Wang et al.

(10) Patent No.: US 10,459,308 B2
(45) Date of Patent: Oct. 29, 2019

(54) METHOD AND SYSTEM OF SELF-CONTAINED AND SELF-POWERED CONTROLLER

(71) Applicant: FURCIFER INC., Menlo Park, CA (US)

(72) Inventors: Jian Wang, Menlo Park, CA (US); Yan Zhou, Menlo Park, CA (US)

(73) Assignee: Furcifer Inc., Menlo Park, CA (US)

( * ) Notice: Subject to any disclaimer, the term of this patent is extended or adjusted under 35 U.S.C. 154(b) by 18 days.

(21) Appl. No.: 15/882,443

(22) Filed: Jan. 29, 2018

(65) Prior Publication Data
US 2019/0235342 A1    Aug. 1, 2019

(51) Int. Cl.
*G02F 1/163* (2006.01)
*G02F 1/161* (2006.01)
(Continued)

(52) U.S. Cl.
CPC ............. *G02F 1/163* (2013.01); *B32B 7/12* (2013.01); *B32B 17/10513* (2013.01);
(Continued)

(58) Field of Classification Search
CPC .......... G02F 1/163; G02F 1/155; G02F 1/153; E06B 2009/2464; E06B 9/24
(Continued)

(56) References Cited

U.S. PATENT DOCUMENTS

2003/0214695 A1 * 11/2003 Abramson ............... G02F 1/15
359/265

2015/0219975 A1 * 8/2015 Phillips ..................... E06B 9/24
359/275
(Continued)

FOREIGN PATENT DOCUMENTS

WO    2016086017 A1    6/2016
WO    2017075059 A1    5/2017

OTHER PUBLICATIONS

Search Report for European Application No. 19153593.9, dated Jun. 19, 2019, 9 pages.

*Primary Examiner* — Mohammed A Hasan

(57) ABSTRACT

The disclosure relates generally to an electrochromic system. The system may include one or more electrochromic devices and a central control device. Each electrochromic device may include two glass layers, two adhesive layers, an electrochromic film, a controller, and a control device. The two adhesive layers may be disposed on inner surfaces of the two glass layers. The electrochromic film may be disposed between the two adhesive layers, the electrochromic film including an electrochromic material layer, a solid polymer electrolyte, and a charge storage layer. The controller may include a power converter, a signal receiver, and a power output. The power converter may be configured to receive power from a power source. The power source may include an energy storage integrated with the controller. The signal receiver may be configured to receive a control signal. The power output may be coupled to the electrochromic film and configured to provide power to the electrochromic film to control optical state of the electrochromic film. The control device may be configured to send the control signal to the signal receiver. The central control device may be configured to globally control optical states of all of the one or more electrochromic devices.

18 Claims, 14 Drawing Sheets

(51) Int. Cl.
| | |
|---|---|
| H02J 7/35 | (2006.01) |
| H02J 50/10 | (2016.01) |
| E06B 9/24 | (2006.01) |
| E06B 3/67 | (2006.01) |
| E06B 7/28 | (2006.01) |
| B32B 7/12 | (2006.01) |
| B32B 17/10 | (2006.01) |
| G02F 1/153 | (2006.01) |
| H02S 99/00 | (2014.01) |
| H02S 40/38 | (2014.01) |
| H04W 4/80 | (2018.01) |
| G02F 1/15 | (2019.01) |

(52) U.S. Cl.
CPC .............. *E06B 3/6722* (2013.01); *E06B 7/28* (2013.01); *E06B 9/24* (2013.01); *G02F 1/1533* (2013.01); *G02F 1/161* (2013.01); *H02J 7/35* (2013.01); *H02J 50/10* (2016.02); *E06B 2009/2464* (2013.01); *G02F 2001/164* (2019.01); *G02F 2202/022* (2013.01); *G02F 2202/28* (2013.01); *H02S 40/38* (2014.12); *H02S 99/00* (2013.01); *H04W 4/80* (2018.02)

(58) Field of Classification Search
USPC .......................................................... 359/275
See application file for complete search history.

(56) References Cited

U.S. PATENT DOCUMENTS

2016/0085130 A1* 3/2016 Timofejevs ............... G02F 1/15
　　　　　　　　　　　　　　　　　　　　　359/275
2017/0298682 A1　10/2017　Wang et al.

* cited by examiner

METHOD AND SYSTEM OF SELF-CONTAINED AND SELF-POWERED CONTROLLER

TECHNICAL FIELD

The present disclosure relates generally to electrochromic films, and in particular, to methods and systems for controlling electrochromic devices.

BACKGROUND

Electrochromism is a phenomenon displayed by some materials of reversibly changing optical properties by using bursts of charges to cause electrochemical redox (reduction and oxidation) reactions in electrochromic materials. The optical properties may include transmittance, reflectance, absorptance and emittance. In particular, electrochromic materials exhibit a reversible color change.

In an application of smart windows, electrochromic films are integrated with the glass window to become serviceable. Electric controller are used to control the electrochromic films integrated with glass windows (i.e., smart windows). The smart windows can be controlled locally and globally. In a building with many smart windows integrated with electrochromic films, a user may be able to control each single window independently as well as to control all the windows simultaneously by a central unit to overwrite the local control. To simplify installations of smart windows, a control unit could be integrated into a smart window as a self-contained and self-powered unit. In such control unit, no external power is needed. In addition, the installation can be further simplified by utilizing wireless charging.

In the present disclosure, we present different methods and systems for controlling state of electrochromic devices.

SUMMARY

One aspect of the present disclosure is directed to an electrochromic system. The system may include one or more electrochromic devices and a central control device. Each electrochromic device may include two glass layers, two adhesive layers, an electrochromic film, a controller, and a control device. The two adhesive layers may be disposed on inner surfaces of the two glass layers. The electrochromic film may be disposed between the two adhesive layers, the electrochromic film including an electrochromic material layer, a solid polymer electrolyte, and a charge storage layer. The controller may include a power converter, a signal receiver, and a power output. The power converter may be configured to receive power from a power source. The power source may be include energy storage integrated with the controller. The signal receiver may be configured to receive a control signal. The power output may be coupled to the electrochromic film and configured to provide power to the electrochromic film to control optical state of the electrochromic film. The control device may be configured to send the control signal to the signal receiver. The central control device may be configured to globally control optical states of all of the one or more electrochromic devices.

One aspect of the present disclosure is directed to an electrochromic system. The system may include one or more electrochromic devices and a wireless central control device. Each electrochromic device may include two glass layers, two adhesive layers, an electrochromic film, a controller, and a wireless control device. The two adhesive layers may be disposed on inner surfaces of the two glass layers. The electrochromic film may be disposed between the two adhesive layers, the electrochromic film including an electrochromic material layer, a solid polymer electrolyte, and a charge storage layer. The controller may include a power converter, a signal receiver, and a power output. The power converter may be configured to receive power from a power source. The power source may include an energy storage integrated with the controller. The signal receiver may be configured to receive a control signal. The power output may be coupled to the electrochromic film and configured to provide power to the electrochromic film to control optical state of the electrochromic film. The wireless control device may be configured to send the control signal to the signal receiver. The wireless central control device may be configured to globally control optical states of all of the one or more electrochromic devices.

Another aspect of the present disclosure is directed to an electrochromic system. The system may include a plurality of electrochromic devices. Each electrochromic device may include an electrochromic film, a controller, one or more ZigBee coordinators, and a ZigBee gateway. The electrochromic film may include an electrochromic material layer, a solid polymer electrolyte, and a charge storage layer. The controller may include a ZigBee receiver configured receive control signals to control optical state of the electrochromic film. Each ZigBee coordinator may be configured to communicate with one or more of the ZigBee receivers. The ZigBee gateway may be configured to communicate with the ZigBee coordinators and be connected to the Internet.

Another aspect of the present disclosure is directed to a system for globally controlling a plurality of smart windows in a multi-floor building through ZigBee protocol. The system may comprise a plurality of ZigBee receivers, one or more ZigBee coordinators, and one ZigBee gateway. Each ZigBee receiver may be configured to be installed on each smart window, and receive controlling signals to control optical state of the each smart window. Each ZigBee coordinator may be configured to be installed on each floor, and coordinate ZigBee receivers on the same floor. The ZigBee gateway may be configured to globally and remotely control optical sates of all smart windows in the building. The ZigBee receivers and the ZigBee coordinators may form a ZigBee network, and the ZigBee gateway may be configured to connect the ZigBee network to the Internet.

Another aspect of the present disclosure is directed to an electrochromic device. The electrochromic device may include two glass layers, two adhesive layers, an electrochromic film, a controller, and a control device. The two adhesive layers may be disposed on inner surfaces of the two glass layers. The electrochromic film may be disposed between the two adhesive layers, the electrochromic film including an electrochromic material layer, a solid polymer electrolyte, and a charge storage layer. The controller may include a power converter, a signal receiver, and a power output. The power converter may be configured to receive power from a power source. The power source may include an energy storage integrated with the controller. The signal receiver may be configured to receive a control signal. The power output may be coupled to the electrochromic film and configured to provide power to the electrochromic film to control optical state of the electrochromic film. The control device may be configured to send the control signal to the signal receiver.

Other objects, features and advantages of the described embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

Specific, non-limiting embodiments of the present invention will now be described with reference to the drawings.

It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Unless the context requires otherwise, throughout the present specification and claims, the word "comprise" and variations thereof, such as, "comprises" and "comprising" are to be construed in an open, inclusive sense, that is as "including, but not limited to". Numeric ranges are also inclusive of the numbers defining the range. Additionally, the singular forms "a", "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Figure 1:
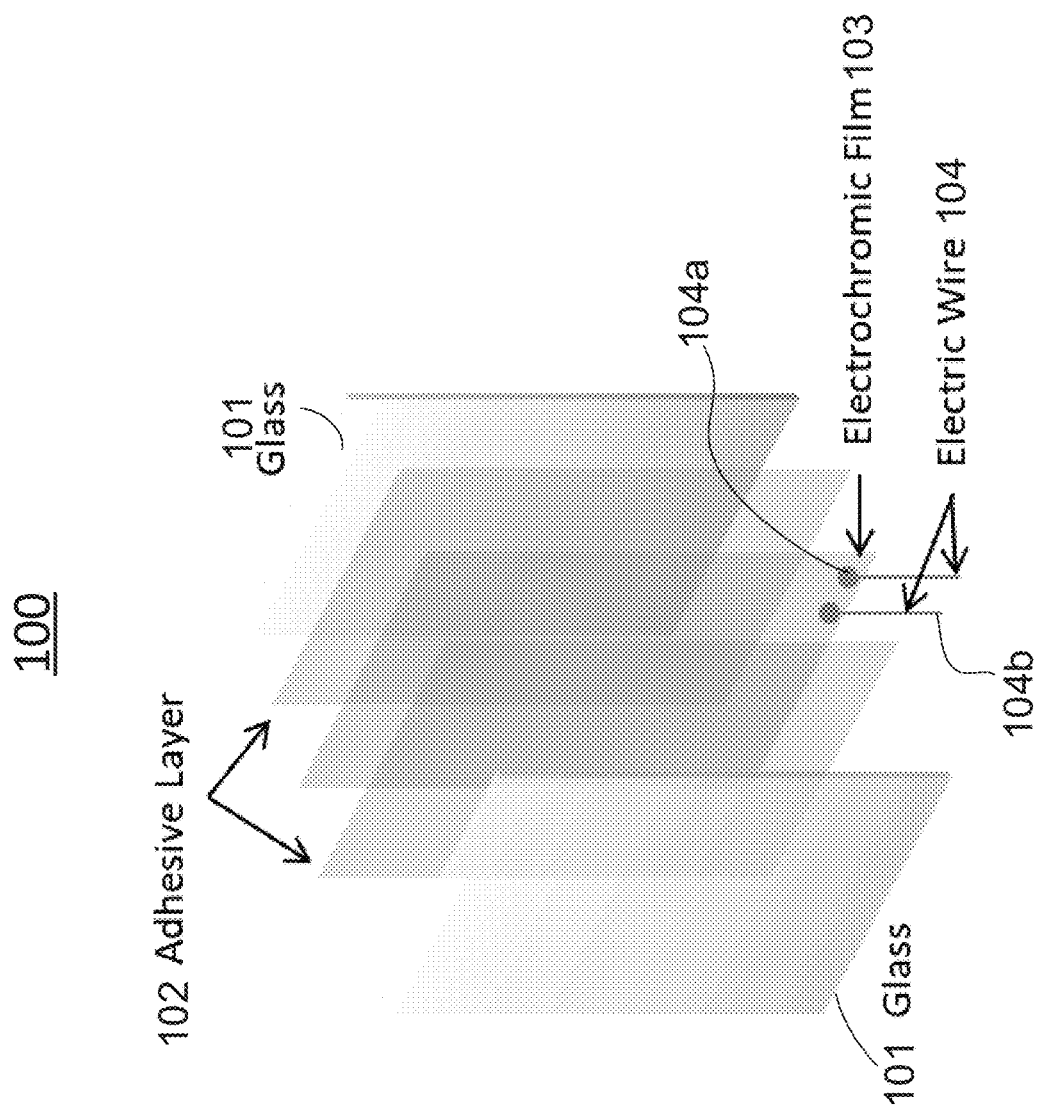
FIG. 1 is a graphical presentation illustrating a simplified schematic of an electrochromic device, consistent with exemplary embodiments of the present disclosure.
Figure 3:
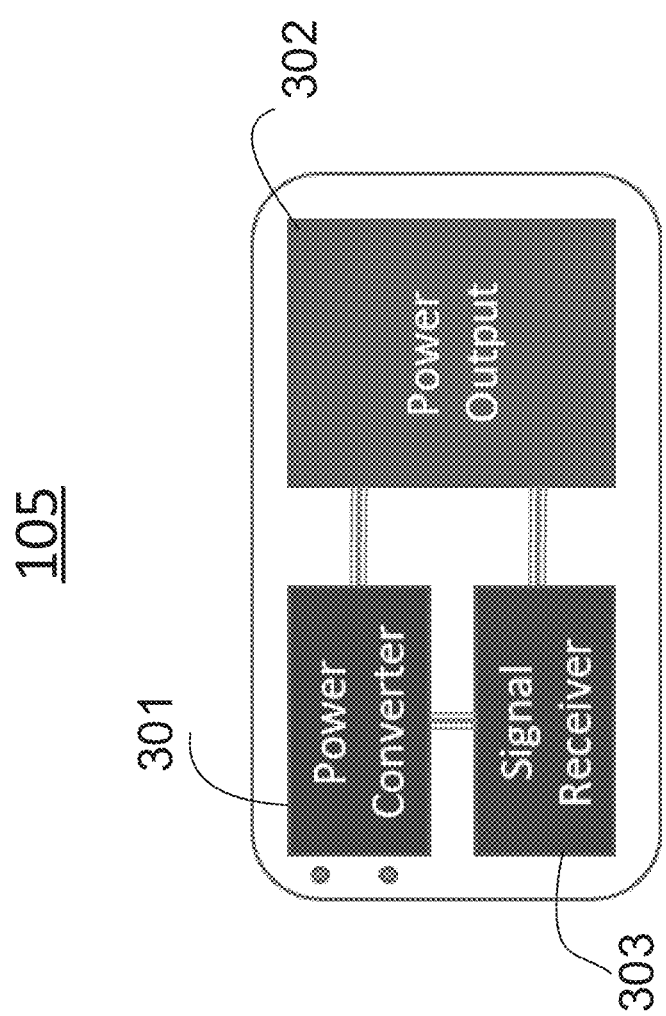
FIG. 3 is a graphical presentation illustrating a controller, consistent with exemplary embodiments of the present disclosure.

Electrochromic materials are commonly used in electrochromic devices. FIG. 1 is a graphical illustration showing a simplified schematic of an electrochromic device 100 (e.g., a smart window), consistent with exemplary embodiments of the present disclosure. The electrochromic device 101 may include two layers of glass 101, two adhesive layers 102, an electrochromic film 103, one or more electric wires 104, and a controller 105 (as shown in FIG. 3).

The electrochromic film 103 is sandwiched between the two layers of glass 101. The adhesive layers 102 are configured to attached the electrochromic film 103 to the layers of glass 101. The integration of the electrochromic film 103 with the window (layers of glass 101) is described in details in patent application U.S. Ser. No. 15/399,852, which is incorporated herein by reference.

One end 104a of the electric wires 104 is electrically connected to the electrochromic film 103. The other end 104b of the electric wires 104 is electrically connected to the controller 105. The controller 105 may be configured to control the state of the electrochromic device 100 by controlling the states of the electrochromic film 103. The controller 105 may be placed outside the glass 101, or laminated between the two layers of glass 101 similar to the electrochromic film 103.

In some embodiments, the adhesive layers may include a polymeric material, particularly a thermosetting polymer material. Suitable thermoset polymer materials may include, but are not limited to, polyvinyl butyral (PVB), ethylene-vinyl acetate (EVA), polyurethanes, etc. In some embodiments, the two adhesive layers may comprise a material that not only is configured to bond the electrochromic film thereto, but is also transparent. The two adhesive layers may use the same materials or different materials.

The electrochromic film 103 comprising a solid electrolyte disposed therein, according to one embodiment. The detailed structure of the electronic film 103 is shown in FIG. 2 and described in detail below.

The exemplary electrochromic device 100 shown in FIG. 1 can be the electrochromic devices described in the specification and shown in the other figures.

Figure 2:
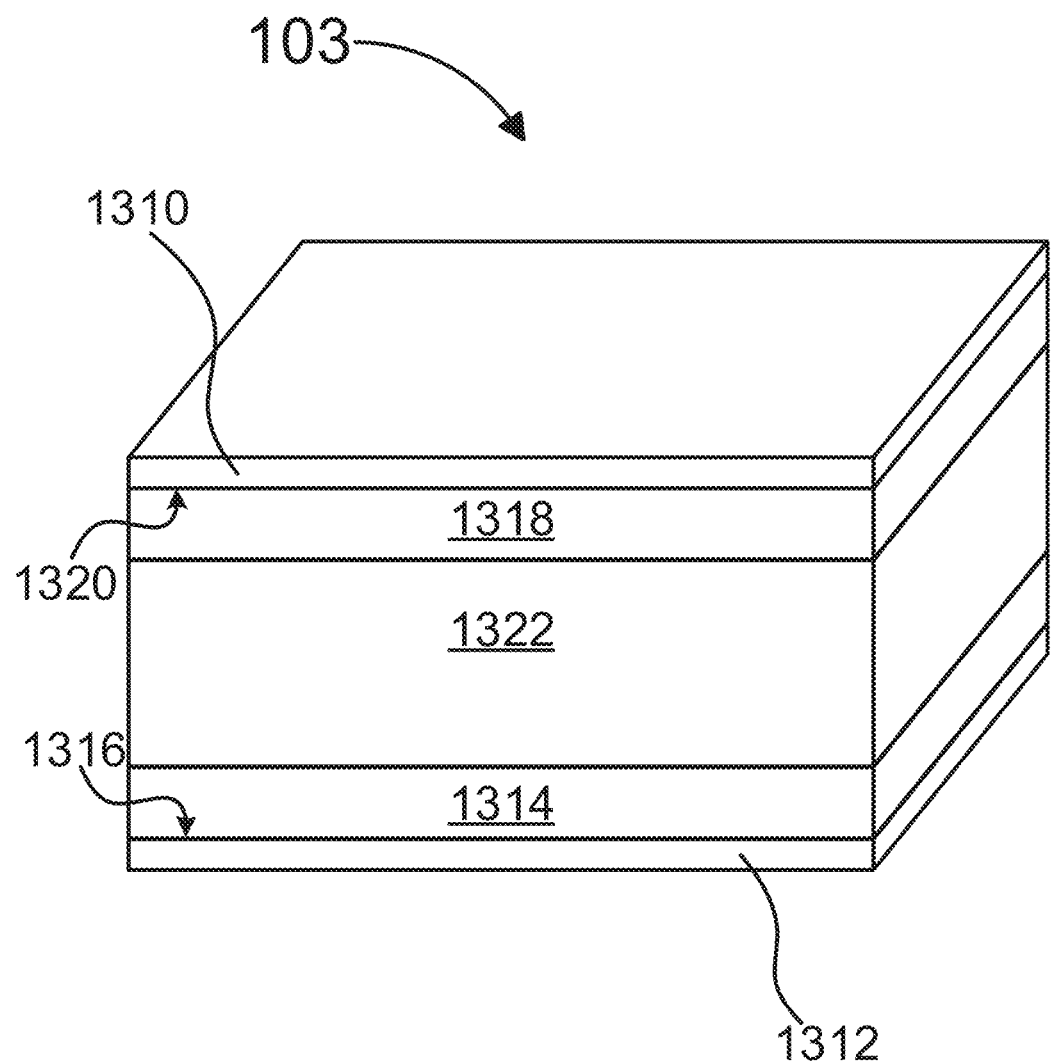
FIG. 2 is a sectional view of a simplified schematic of an electrochromic device comprising a solid polymer electrolyte therein, consistent with exemplary embodiments of the present disclosure.

As shown in FIG. 2, the electrochromic film 103 may include a first transparent electrically conductive film 1312 and a second transparent electrically conductive film 1310. The first and second electrically conductive films 1312, 1310 may have the same or different dimensions, comprise the same or different material, etc. In some embodiments, the first and second transparent electrically conductive films may be adhesive films as shown in FIG. 1. In some other embodiments, the first and second transparent electrically conductive films may be additional films. The first and second electrically conductive films 1312, 1310 may also each independently have a single layer or multilayer structure. Suitable material for the first and second electrically conductive films 1312, 1310 may include, but is not limited to, tin doped indium oxide (ITO), fluorine doped indium oxide, antimony doped indium oxide, zinc doped indium oxide, aluminum doped zinc oxide, silver nano wire, metal mesh, combinations thereof, and/or other such transparent material exhibiting sufficient electrical conductance. In preferred aspects, the first and second electrically conductive films 1312, 1310 may comprise ITO. The power output 302 may be configured to supply power between the first and second electrically conductive films 1312, 1310.

As further shown in FIG. 2, a layer 1314 of electrochromic material is deposited on the interior surface 1316 of the first electrically conductive film 1312. The layer 1314 of electrochromic material is configured to effect a reversible color change upon reduction (gain of electrons) or oxidation (loss of electron) caused by exposure to an electrical current. In some embodiments, the layer 1314 of electrochromic material may be configured to change from a transparent state to a colored state, or from a colored state to another colored state, upon oxidation or reduction. In some embodiments, the layer 1314 of electrochromic material may be a polyelectrochromic material in which more than two redox states are possible, and may thus exhibit several colors.

In some embodiments, the layer 1314 of electrochromic material may comprise an organic electrochromic material, an inorganic electrochromic material, a mixture of both, etc. The layer 1314 of electrochromic material may also be a reduction colored material (i.e., a material that becomes colored upon acquisition of electrons), or an oxidation colored material (i.e., a material that becomes colored upon the loss of electrons).

In some embodiments, the layer 1314 of electrochromic material may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the layer 1314 of electrochromic material may include a conductive polymer such as poly-3,4-ethylenedioxy thiophene (PEDOT), poly-2,2'-bithiophene, polypyrrole, polyaniline (PANI), polythiopene, poly-isothianaphthene, poly(o-aminophenol), polypyridine, polyindole, polycarbazole, polyquinone, octacyanophthalocyanine, combinations thereof, etc. Moreover, in some embodiments, the layer 1314 of electrochromic material may include materials, such as viologen, anthraquinone, phenocyazine, combinations thereof, etc. Additional examples of electrochromic materials, particularly those including multicolored electrochromic polymers, may be found in U.S. Patent Application No. 62/331,760, filed May 4, 2016, titled Multicolored Electrochromic Polymer Compositions and Methods of Making and Using the Same, and U.S. patent application Ser. No. 15/399,839, filed on Jan. 6, 2017, titled Multicolored Electrochromic Polymer Compositions and Methods of Making and Using the Same. The entirety of the above-referenced two applications are herein incorporated by reference.

As additionally shown in FIG. 2, a charge storage layer 1318 is deposited on the interior surface 1320 of the second electrically conductive film 1310. Suitable materials for the charge storage layer 1318 may include, but are not limited to, vanadium oxide, binary oxides (e.g., CoO, $IrO_2$, MnO, NiO, and $PrO_x$), ternary oxides (e.g., $Ce_xV_yO_z$), etc.

In some embodiments, the charge storage layer 1318 may be replaced with an optional second layer of electrochromic material. This optional second layer of electrochromic material may have the same or different dimensions, comprise the same or different composition, etc., as the first layer 1314 of electrochromic material.

The electrochromic film 103 also includes an electrolyte layer 1322 positioned between the layer 1314 of electrochromic material and the charge storage layer 1318. In some embodiments, the electrolyte layer 1322 may include a liquid electrolyte as known in the art. In some embodiments, the electrolyte layer 1322 may include a solid state electrolyte, including but not limited to, $Ta_2O_5$, MgF, $Li_3N$, $LiPO_4$, $LiBO_2$—$Li_2SO_4$, etc. In some embodiments, the electrolyte layer 1322 may include a polymer based electrolyte comprising an electrolyte salt (e.g., LiTFSI, $LiPF_6$, $LiBF_4$, $LiClO_4$, $LiCF_3SO_3$, $LiN(CF_3SO_2)_2$, $LiSbFg$, $LiAsF_6$, $LiN(CF_3CF_2SO_2)_2$, $(C_2H_5)_4NBF_4$, $(C_2H_5)_3CH_3NBF_4$, LiI, etc.), a polymer matrix (e.g., polyethylene oxide, poly(vinylidene fluoride(PVDF), poly(methyl methacrylate) (PMMA), polyethylene oxide (PEO), poly(acrylonitrile) (PAN), polyvinyl nitrile, etc.), and one or more optional plasticizers (e.g., glutaronitrile, succinonitrile, adiponitrile, fumaronitrile, etc.).

In some embodiments, the electrolyte layer 1322 comprises a solid polymer electrolyte. In one embodiment, the solid polymer electrolyte comprises a polymer framework, at least one solid plasticizer, and at least one electrolyte salt. In some embodiments, the polymer framework may include a polar polymer material having an average molecular weight of about 10,000 Daltons or greater. In particular embodiments, the polar polymer material may have an average molecular weight in a range from about 10,000 Daltons to about 800,000,000 Daltons. In some embodiments, the polar polymer material may be present in an amount ranging from about 15 wt. % to about 80 wt. % based on the total weight of the solid polymer electrolyte.

The aforementioned polar polymer material may include one or more polar polymers, each of which may include one or more of: C, N, F, O, H, P, F, etc. Suitable polar polymers may include, but are not limited to, polyethylene oxide, poly(vinylidene fluoride-hexafluoropropylene, poly(methyl methacrylate), polyvinyl nitrile, combinations thereof, etc. In embodiments where a plurality of polar polymers is present, the polymers may be crosslinked to form a network having enhanced mechanical properties.

The polar polymer material may have a sufficient amorphicity so as to achieve sufficient ion conductivity. Amorphous polymer materials typically exhibit high ion conductivities. Accordingly, in some embodiments, the polar material disclosed herein may have an amorphous, or a substantially amorphous, microstructure.

In some embodiments, the polar polymer material may have a semi-crystalline or crystalline microstructure. In such cases, various modifications may be implemented with respect to the polymer material to suppress the crystallinity thereof. For instance, one modification may involve use of branched polar polymers, linear random copolymers, block copolymers, comb polymers, and/or star-shaped polar polymers. Another modification may include incorporation of an effective amount of solid plasticizers in the polar polymer material, as discussed in greater detail below.

Various properties of the polar polymer material also may be selected and/or modified to maximize ion conductivity. These properties may include, but are not limited to, glass transition temperature, segmental mobility/flexibility of the polymer backbone and/or any side chains attached thereto, orientation of the polymers, etc.

As noted above, the presently disclosed solid electrolyte may include at least one solid plasticizer. The at least one solid plasticizer may be substantially miscible in the polymer framework of the solid plasticizer. The at least one solid plasticizer may include an organic material (e.g., small, solid organic molecules) and/or an oligomeric polymer material, in some embodiments. In various embodiments, the at least one solid plasticizer may be selected from the group including glutaronitrile, succinonitrile, adiponitrile, fumaronitrile, and combinations thereof.

In some embodiments, a plurality of solid plasticizers may be present in the polymer framework, where each plasticizer may independently include an organic material (e.g., small, solid organic molecules) and/or an oligomeric polymer material. Particularly, each plasticizer may independently be glutaronitrile, succinonitrile, adiponitrile, fumaronitrile, etc. Moreover, the dimensions of at least two, some, a majority, or all of the plasticizers may be the same or different as one another.

In some embodiments, the total amount of solid plasticizer may be in a range from about 20 wt. % to about 80 wt. % based on the total weight of the solid electrolyte.

As additionally noted above, the solid polymer electrolyte may include at least one electrolyte salt. In some embodiments, the at least one electrolyte salt may comprise an organic salt. In some embodiments, the at least one electrolyte salt may comprise an inorganic salt. Suitable electrolyte salts may include, but are not limited to, LiTFSI, $LiPF_6$, $LiBF_4$, $LiClO_4$, $LiCF_3SO_3$, $LiN(CF_3SO_2)_2$, $LiSbF_6$, $LiAsF_6$, $LiN(CF_3CF_2SO_2)_2$, $(C_2H_5)_4NBF_4$, $(C_2H_5)_3CH_3NBF_4$, LiI, combinations thereof, etc. In some embodiments, the total amount of electrolyte salt may be in a range from about 10 wt. % to about 50 wt. % based on the total weight of the solid electrolyte.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. Additionally, the solid polymer electrolyte may have an ion conductivity in a range from about $10^{-7}$ S/cm to about $10^{-3}$ S/cm.

Methods of making the presently disclosed solid polymer electrolyte may include synthesis, polymerization, solvation, etc. processes as known in the art. In one particular, non-limiting embodiment, a method of making the presently disclosed polymer electrolyte may include: (a) combining the polymer framework, the at least one plasticizer, and the at least one electrolyte salt in an appropriate solvent; and (b) removing the solvent to obtain the solid polymer electrolyte. Exemplary solvents may include, but are not limited to, acetone, methanol, tetrahydrofuran, etc. In some embodiments, one or more experimental parameters may be optimized to facilitate the dissolving of the polymer framework, plasticizer, and electrolyte salt in the solvent. These experimental parameters may include the components remain in the solvent, agitation/stirring of the solvent, etc.

In some embodiments, the electrolyte layer 1322 of FIG. 2 comprises a solid polymer electrolyte, such as the solid polymer electrolytes described above, and does not include any liquid or gel electrolyte. Such a solid polymer electrolyte (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ion conductivities as compared to convention polymer electrolytes; etc.

Additional examples of electrolyte materials, particularly those including solid polymer electrolytes, may be found in U.S. Patent Application No. 62/323,407, filed Apr. 15, 2016, titled Solid Polymer Electrolyte for Electrochromic Devices, and U.S. patent application Ser. No. 15/487,325, filed on Apr. 13, 2017, titled Solid Polymer Electrolyte for Electrochromic Devices. The entirety of the above-referenced two applications are herein incorporated by reference.

The electrochromic film 103 may be used in various applications and/or in permutations, which may or may not be noted in the illustrative embodiments/aspects described herein. For instance, the electrochromic film 103 may include more or less features/components than those shown in FIG. 2, in some embodiments. Additionally, unless otherwise specified, one or more components of the electrochromic film 103 may be of conventional material, design, and/or fabricated using known techniques (e.g., sputtering, chemical vapor deposition (CVD), physical vapor deposition (PVD), plasma-enhanced chemical vapor deposition (PECVD), spray coating, slot-die coating, dip coating, spin coating, printing, etc.), as would be appreciated by skilled artisans upon reading the present disclosure.

FIG. 3 is a graphical presentation illustrating a controller, consistent with exemplary embodiments of the present disclosure. The controller 105 may include a power converter 301, a power output control 302, and a signal receiver 303. The power converter 301 may convert input power from a power source to the power required by the signal receiver 303 and the power output control 302. The power source could be either a power source integrated with the controller 105 as a self-contained, self-powered unit, or an external power source, provided by, for example, power of a building where the electrochromic device is installed. The power output control 302 may be configured to supply power to the electrochromic film 103 to control optical state of the electrochromic film 103. The optical state of an electrochromic film may refer to lightness, transparency, color, reflectance, etc. Since the state of the electrochromic film 103 is driven by electric charges, the power output control 302 can inject into or extract a certain amount of electric charges from the electrochromic film 103 based on the signals the signal receiver 303 receives, in order to change the state of the electrochromic film 103. The signal receiver 303 may be configured to receive signals sent to the controller 105, and transfer the signals to the power output control 302. In some embodiments, the signal receiver 303 may be connected to a control device and a central control device to provide both local and global controls of the electrochromic device 100.

Figure 4:
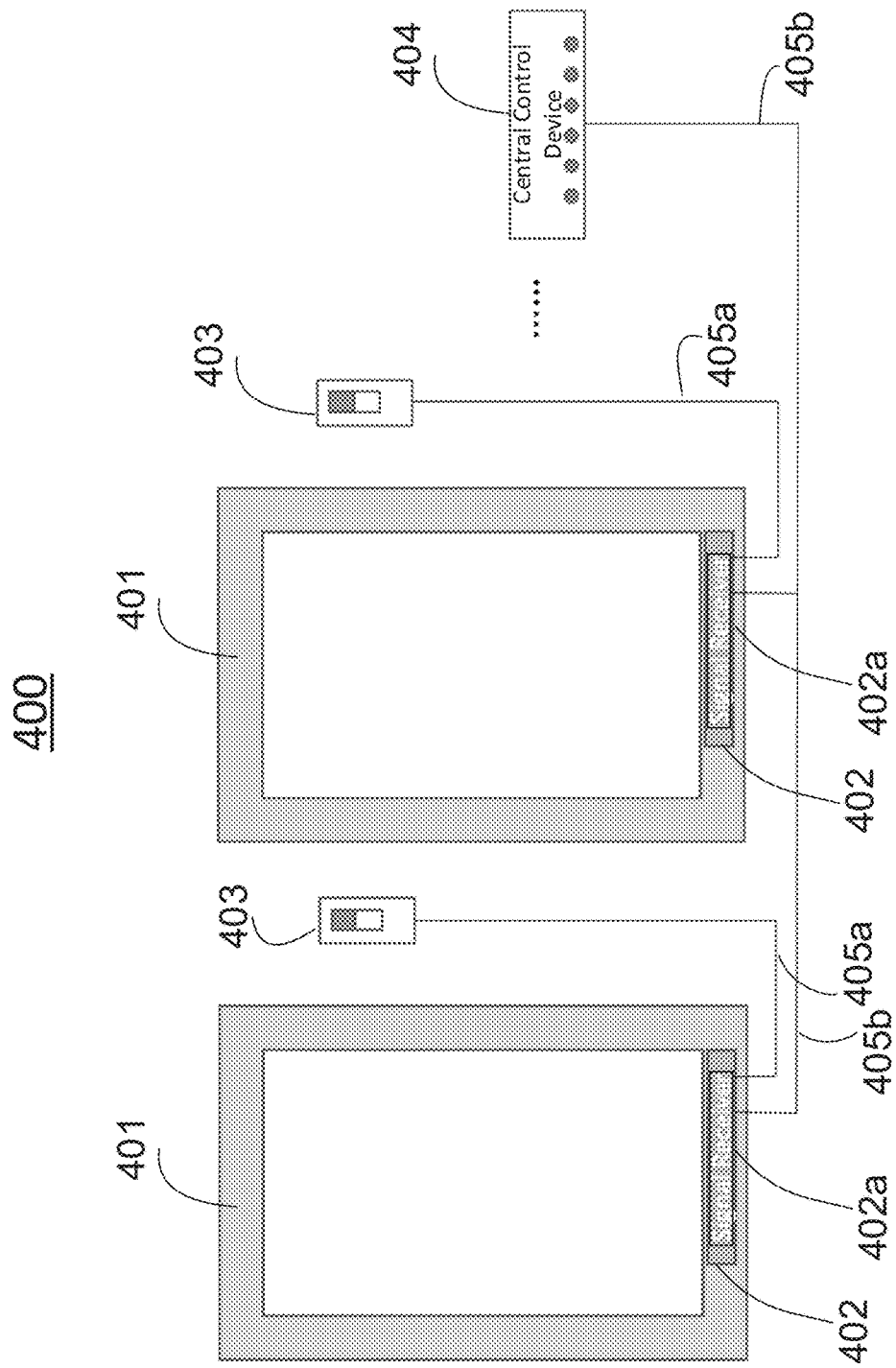
FIG. 4 is a graphical presentation illustrating a system with wired local and wired global control of electrochromic device, consistent with exemplary embodiments of the present disclosure.

In one embodiment, a signal receiver may be connected to a control device and a central control device through cables, i.e., wired local and wired global control. FIG. 4 shows a graphic presentation illustrating a system 400 with wired local and wired global control of electrochromic devices (e.g. smart windows) through cables, consistent with exemplary embodiments of the present disclosure. The system 400 may include one or more electrochromic devices 401, one or more controllers 402, one or more control devices 403, a central control device 404, a plurality of wires/cables 405a, and a bus line 405b. In some embodiments, the electrochromic devices 401 may be smart windows. Each electrochromic device 401 is installed with a controller 402. In some embodiments, the controller 402 may be embedded inside the frame of the smart window, or installed outside the window. In some embodiments, the controller 402 may be laminated between layers of glass of the electrochromic device 401.

Each controller 402 includes a signal receiver 402a. Each signal receiver 402a is independently connected to a control device 403 through wires/cables 405a. The control device 403 is a local device installed nearby the electrochromic device 401. By flipping (touching or pressing a button on) the control device 403, control signals can be transferred to the signal receiver 402a, and the state of the electrochromic device can be changed accordingly.

The signal receivers 402a of the one or more electrochromic devices 401 are also bundled together, and connected to a central control device 404 through a bus line 405b. The central control device 404 may be configured to control all the electrochromic devices 401 in a room, in a floor, or in a whole building. In some embodiments, the central control device 404 may send a control signal to collectively and simultaneously change all the electrochromic devices 401 to a same state. In some embodiments, the central control device 404 may send a control signal to a specific electrochromic device 401 to change its state. In some embodiments, the central control device 404 may send a control signal to some selected electrochromic devices 401 to change their states simultaneously.

The control device 403 and/or the central control device 404 can be an on-off switch, which has on-and-off two states. In some embodiments, the control device 403 and/or the central control device 404 can have dimming capabilities, which can have multiple states, each corresponding to a light transmission level. The multiple states can be discrete or continuous, and can be states of lightness, transparency, color, and/or reflectance. The electrochromic devices 401 change to different color, lightness, transparency, or reflectance level corresponding to different amount of electric charges. In some embodiments, the control device and/or the central control device can be operated by mechanical touch, voice, radio, optical waves, etc. Similarly, the control device and/or the central control device described in the other embodiments of the present application may have similar features as described above.

Figure 5:
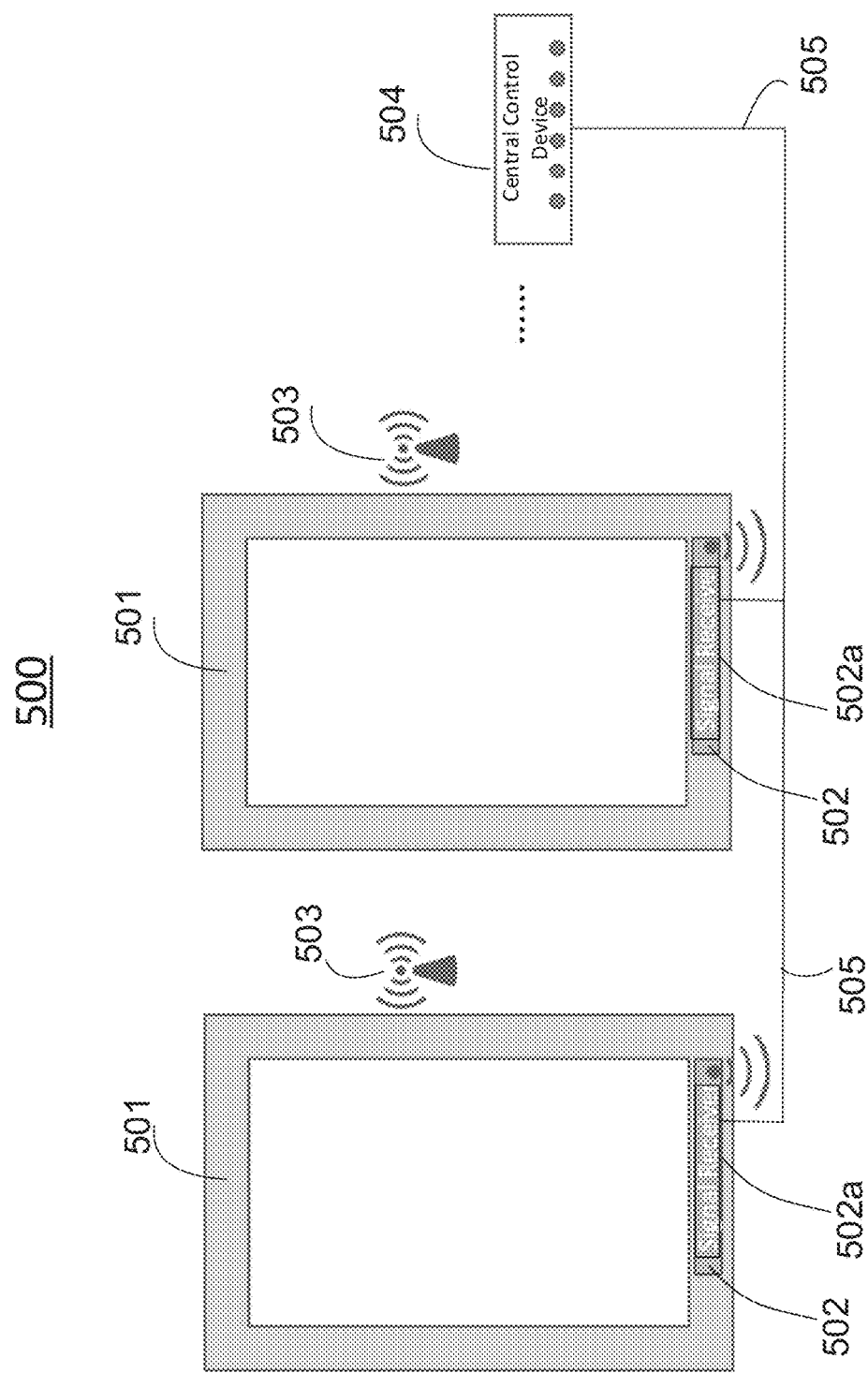
FIG. 5 is a graphical presentation illustrating a system with wireless local control and wired global control of electrochromic devices, consistent with exemplary embodiments of the present disclosure.

In another embodiment, electrochromic devices may be locally controlled by wireless protocol, and globally controlled by a wired central control device, i.e., wireless local control and wired global control. FIG. 5 shows a graphical presentation illustrating a system 500 with wireless local control and wired global control of electrochromic devices (e.g. smart windows), consistent with exemplary embodiments of the present disclosure. The system 500 may include one or more electrochromic devices 501, one or more controllers 502, one or more wireless control devices 503, a central control device 504, and a bus line 505. Each electrochromic device 501 is installed with a controller 502. In some embodiments, the controller 502 may be embedded inside the frame of the smart window, or installed outside the window. In some embodiments, the controller 502 may be laminated between layers of glass of the electrochromic device 501.

Each controller 502 includes a signal receiver 502a. To provide a wireless local control, each signal receiver 502a is capable of receiving wireless signals, and being operated by wireless communication protocol. Each signal receiver 502a is independently and wirelessly connected to a wireless control device 503. The wireless control device 503 is configured to control the electrochromic device 501 via wireless communication protocol. The wireless communication protocol could be radio frequency, such as Bluetooth, Wi-Fi, Z-Wave, ZigBee, etc., or optical waves, such as infrared radiation which is popularly used in consumer electronics, or sound waves. For radio frequency communication protocol, the wireless control device 503 may be an app installed in a radio frequency enabled terminal device, or a stand-alone unit being operated close to the window. For optical waves, the wireless control device 503 could be a remote controller. For sound waves, the electrochromic device 501 can be controlled by voice. For example, the signal receiver 502a may include microphone that receives voice signal and have voice recognition capability to convert the received voice signal to electric signal. In this example, the electrochromic device 501 may not need a control device. The electrochromic device 501 is configured to respond to its wireless control device 503, and change the state of the electrochromic film accordingly. Each wireless control device 503 may have a unique frequency, and the signal receiver 502a corresponding to the wireless control device 503 is configured to receive signals with that unique frequency. By this way, each wireless control device 503 can send signals to a corresponding signal receiver 502a. In another embodiment, each wireless control device 503 may have an ID, which is included in the signal sent by that wireless control device 503. When the signal receiver 502a receives the signals from a wireless control device 503, it will first determine whether it recognizes the ID. If the signal receiver 502a recognizes the ID, it will process the signals from the wireless control device 503. In some embodiments, the multiple wireless control devices 503 can be implemented on one terminal device (e.g., a smart phone, template, wearable device, or computer). The terminal device may transmit signals with different frequencies or different IDs to corresponding electrochromic devices 501.

In addition to the wireless local control, the signal receiver 502a of the one or more electrochromic devices 501 may be also bundled together, and connected to a central control device 504 through a bus line 505. The central control device 504 may be configured to control all the electrochromic devices 501 in a room, in a floor, or in a whole building. In some embodiments, the central control device 504 may send a control signal to collectively and simultaneously change all the electrochromic devices 501 to a same state. In some embodiments, the central control device 504 may also send a control signal to a specific electrochromic device 501 to change its state. In some embodiments, the central control device 504 may send a control signal to some selected electrochromic devices 501 to change their states simultaneously.

Figure 6:
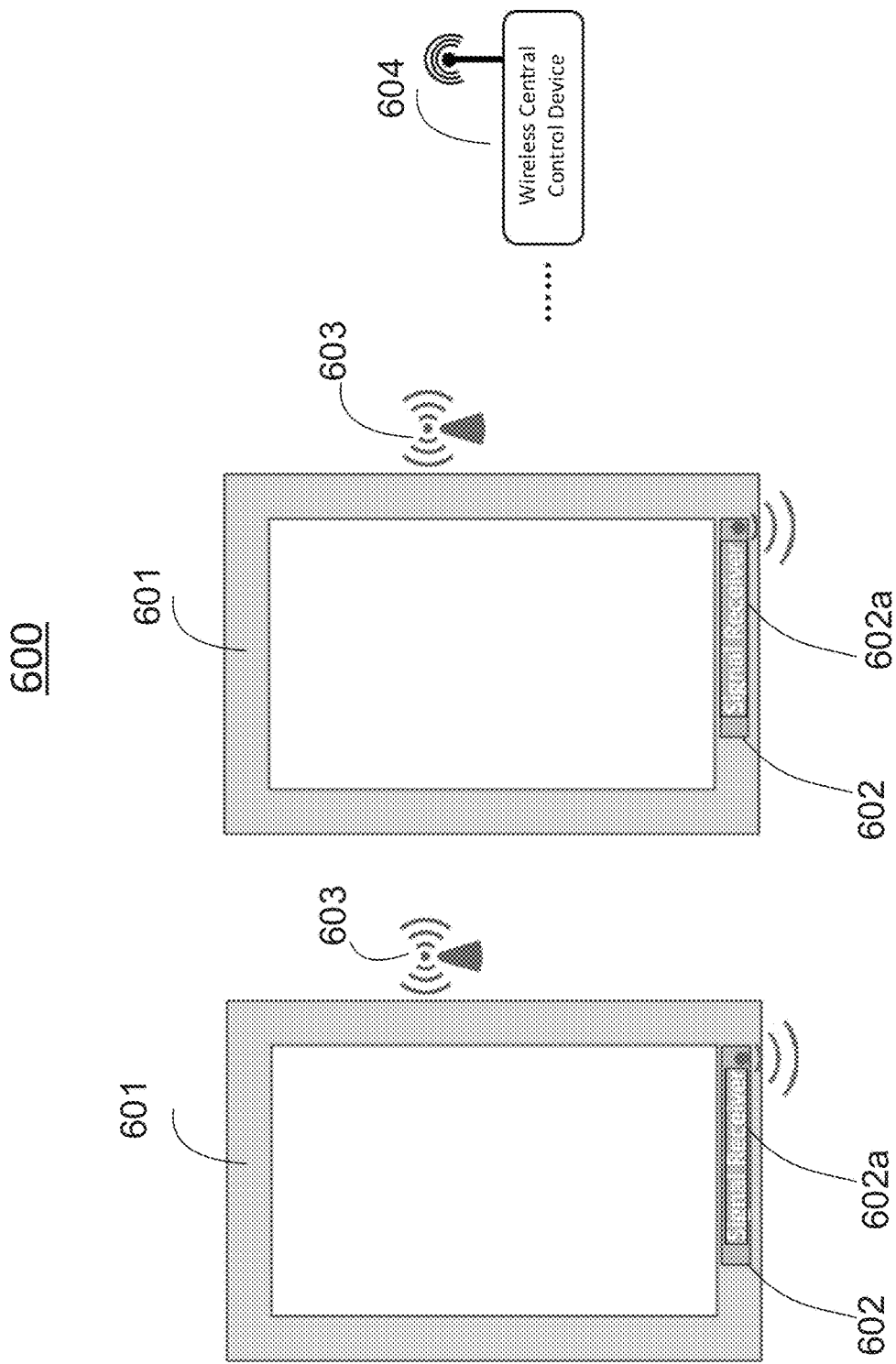
FIG. 6 is a graphical presentation illustrating a system with wireless local and wireless global control, consistent with exemplary embodiments of the present disclosure.

In another embodiment, electrochromic devices may be locally and globally controlled by wireless protocol. FIG. 6 shows a graphical presentation illustrating a system 600 with wireless local and global control (e.g. smart windows), consistent with exemplary embodiments of the present disclosure. The system 600 may include one or more electrochromic devices 601, one or more controllers 602, one or more wireless control devices 603, and a wireless central control device 604. In some embodiments, the electrochromic devices 601 may be smart windows. Each electrochromic device 601 is installed with a controller 602. In some embodiments, the controller 602 may be embedded inside the frame of the smart window, or installed outside the window. In some embodiments, the controller 602 may be laminated between layers of glass of the electrochromic device 101.

Each controller 602 includes a wireless signal receiver 602a. Each signal receiver 602a is capable of receiving wireless signals, and being operated by a wireless communication protocol. Each signal receiver 602a is independently and wirelessly connected to a wireless control device 603. The wireless control device 603 is configured to control the electrochromic device 601 via a wireless communication protocol. The wireless communication protocol could be radio frequency, such as Bluetooth, Wi-Fi, Z-Wave, ZigBee, etc., or optical waves, such as infrared radiation which is popularly used in consumer electronics, or sound waves. For radio frequency communication protocol, the wireless control device 603 may be an app installed in a radio frequency enabled terminal device, or a stand-alone unit being operated close to the window. For optical waves, the wireless control device 603 could be a remote controller. For sound waves, the electrochromic device 601 can be controlled by voice. The electrochromic device 601 is configured to respond to its wireless control device 603, and change the state of the electrochromic film accordingly.

In addition to the wireless local control, the signal receivers 602a of the one or more electrochromic devices 601 are also wirelessly connected to a wireless central control device 604. Each signal receiver 602a may be directly connected to the wireless central control device 604, or connected to each other in a mesh network architecture. The wireless central control device 604 is configured to control the electrochromic devices 601 via wireless communication protocol. The wireless communication protocol could be wireless protocol Wi-Fi, Z-Wave, or ZigBee. The wireless central control device 604 may be configured to control all the electrochromic devices 601 in a room, in a floor, or in a whole building. In some embodiments, the wireless central control device 604 may send a control signal to collectively and simultaneously change all the electrochromic devices 601 to a same state. In some embodiments, the wireless central control device 604 may also send a control signal to a specific electrochromic device 601 to change its state. In some embodiments, the wireless central control device 604 may send a control signal to some selected electrochromic devices 601 to change their states simultaneously. Similar to other embodiments, the control device 603 and central control device 604 may use different frequencies or IDs to control different electrochromic devices 601.

Figure 7:
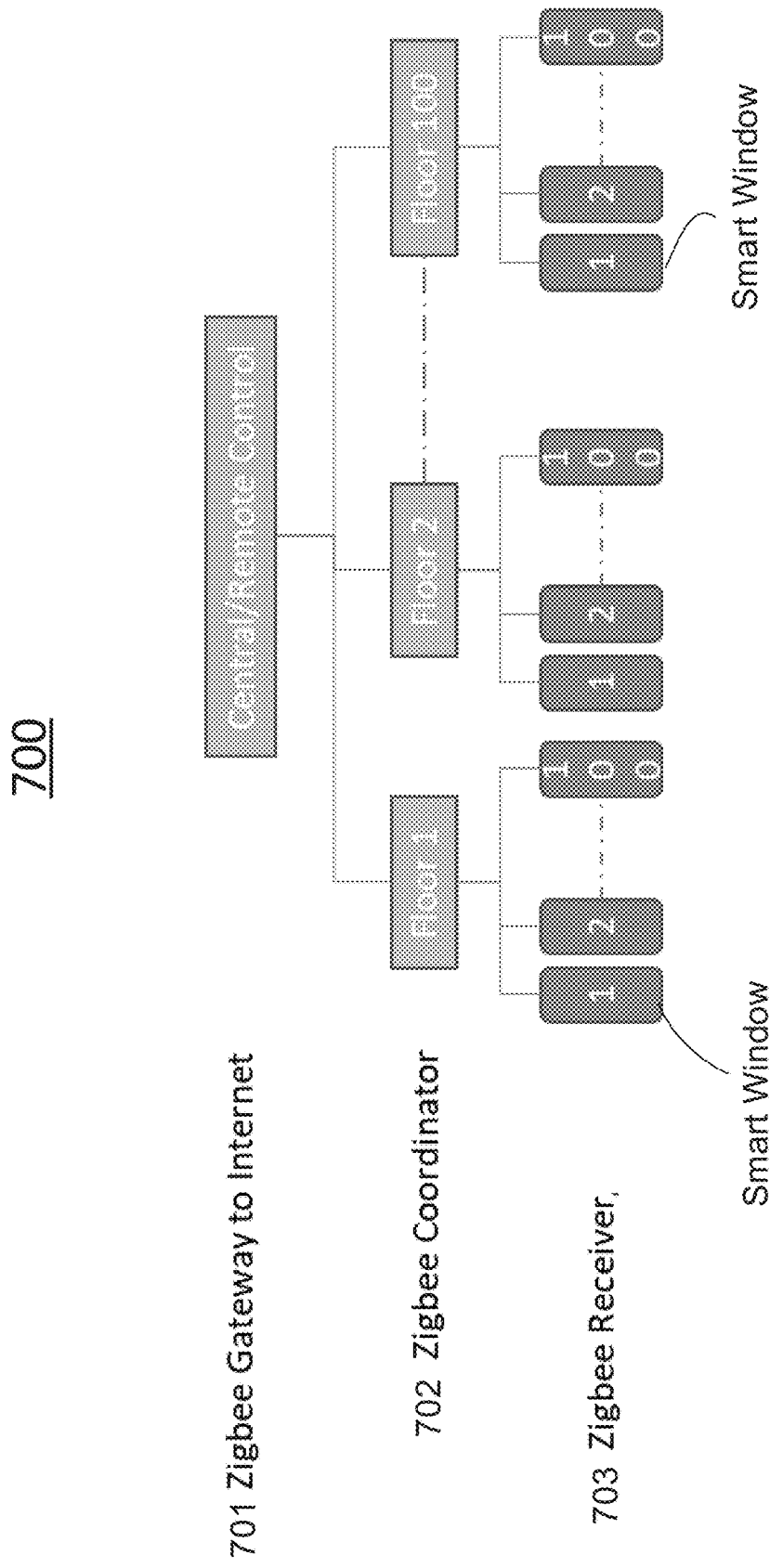
FIG. 7 is a graphical representation illustrating a system with a global control of multiple electrochromic devices through ZigBee protocol, consistent with exemplary embodiments of the present disclosure.

FIG. 7 is a graphical representation illustrating a system 700 with a global control of multiple, for example, 10 k electrochromic devices (e.g. smart windows) through ZigBee protocol, consistent with exemplary embodiments of the present disclosure. The system may include a ZigBee gateway 701, a plurality of ZigBee coordinators 702, and a plurality of ZigBee receivers 703. The system 700 may be installed in a building with a plurality of floors, and each floor may include a plurality of smart windows. Each smart window may be installed with a ZigBee receiver 703. The ZigBee receiver 703 is configured to receive controlling signals to control the state of the smart window. A ZigBee coordinator 702 is installed on each floor, and has transmitters configured to transmit signals to the ZigBee receivers 703 on the same floor to change the state of the smart windows on the floor. The ZigBee receivers 703 and the ZigBee coordinators 702 may form a ZigBee network, and the ZigBee gateway 701 is configured to connect the ZigBee network to the Internet, offering central and remote controls of the smart windows in the whole building.

In general, a ZigBee transmitter's transmission distances is between 10 to 100 meters, depending on power output and environmental conditions. Within a 100-meter transmission distance, ZigBee protocol is suitable for controlling all smart windows on a same floor in a commercial building. In the case of a large building, the ZigBee transmitters can transmit data over long distances by passing data through a mesh network of intermediate devices to reach more distant ones.

Take a high rise commercial building with 100 floors as an example (shown in FIG. 7). Each floor may have 100 large-sized smart windows. On each floor, a ZigBee coordinator 702 may be configured to coordinate the 100 smart windows to switch simultaneously. To control the whole building's smart windows, a total of 100 ZigBee coordinators 702 are required. The 100 ZigBee coordinators 702 are connected to a ZigBee gateway 701 which connects the ZigBee network to the Internet. Accordingly, the state of the 10 k smart windows in the whole building can be controlled remotely via a central control device.

Figure 8:
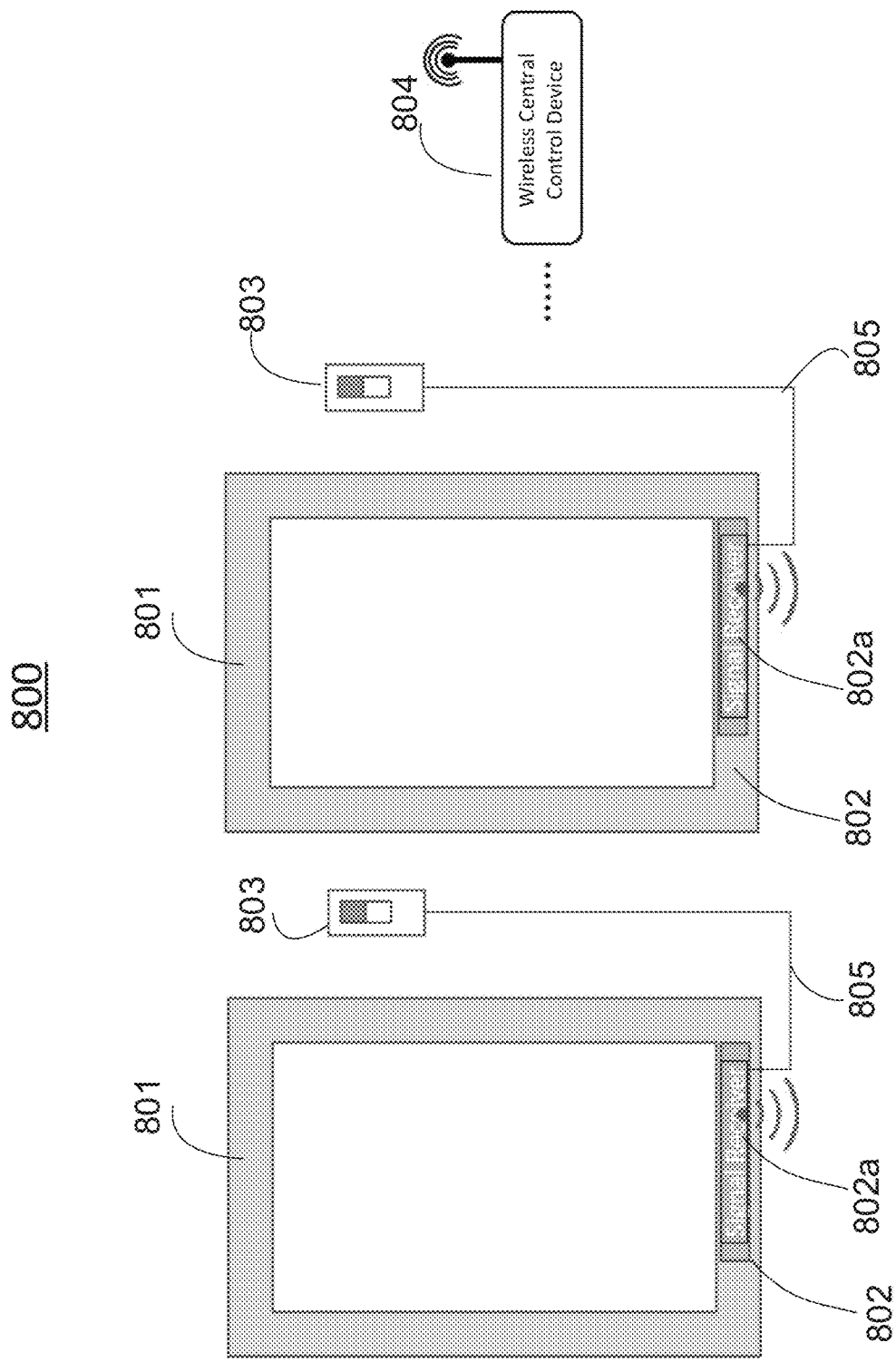
FIG. 8 is a graphical presentation illustrating a system with wired local control and wireless global control of electrochromic devices, consistent with exemplary embodiments of the present disclosure.

In another embodiment, electrochromic devices may be locally controlled by a wired control device, and globally controlled by wireless protocol. FIG. 8 shows a graphic presentation illustrating a system 800 with wired local control and wireless global control of electrochromic devices (e.g. smart windows), consistent with exemplary embodiments of the present disclosure. The system 800 may include one or more electrochromic devices 801, one or more controllers 802, one or more control devices 803, a wireless central control device 804, and a plurality of cables/wires 805. In some embodiments, the electrochromic devices 801 may be smart windows. Each electrochromic device 801 is installed with a controller 802. In some embodiments, the controller 802 may be embedded inside the frame of the smart window, or installed outside the window. In some embodiments, the controller 802 may be laminated between layers of glass of the electrochromic device 801.

Each controller 802 includes a signal receiver 802a. To provide a wireless global control, each signal receiver 802a is capable of receiving wireless signals, and being operated by wireless communication protocol. The signal receivers 802a of the one or more electrochromic devices 801 are wirelessly connected to a wireless central control device 804. Each signal receiver 802a may be directly connected to the wireless central control device 804, or connected to each other in a mesh network architecture. The wireless central control device 804 is configured to control the electrochromic devices 801 via wireless communication protocol. The wireless communication protocol could be radio frequency, such as Bluetooth, Wi-Fi, Z-Wave, ZigBee, etc., or optical waves, such as infrared radiations which is popularly used in consumer electronics, or sound waves. Since the wireless control is global, wireless protocol Wi-Fi, Z-Wave, and ZigBee are preferred. The wireless central control device 804 may be configured to control all the electrochromic devices 801 in a room, in a floor, or in a whole building. In some embodiments, the wireless central control device 804 may send a control signal to collectively and simultaneously change all the electrochromic devices 801 to a same state. In some embodiments, the wireless central control device 804 may also send a control signal to a specific electrochromic device 801 to change its state. In some embodiments, the wireless central control device 804 may send a control signal to some selected electrochromic devices 801 to change their states simultaneously.

In addition, each signal receiver 802a is independently connected to a control device 803 through wires/cables 805. The control device 803 is a local switch installed nearby the electrochromic device 801. By flipping (touching or pressing a button on) the control device 803, control signals can be received by the signal receiver 802a, thus the state of the electrochromic device can be changed accordingly.

In some embodiments, a controller may be placed outside the glass, or laminated between the two layers of glass. A controller that is integrated into a smart window or glass support, or laminated between layers of glass or electrochromic film can be call as a self-contained controller. In addition, since a self-contained controller does not include an external power, the self-contained controller is also self-powered. Without any external power source, the process to connect the electrochromic film to the external power source is avoided. Also an installation of a smart window is as same as an installation of a regular window, since the controller is self-contained and self-powered.

Figure 9:
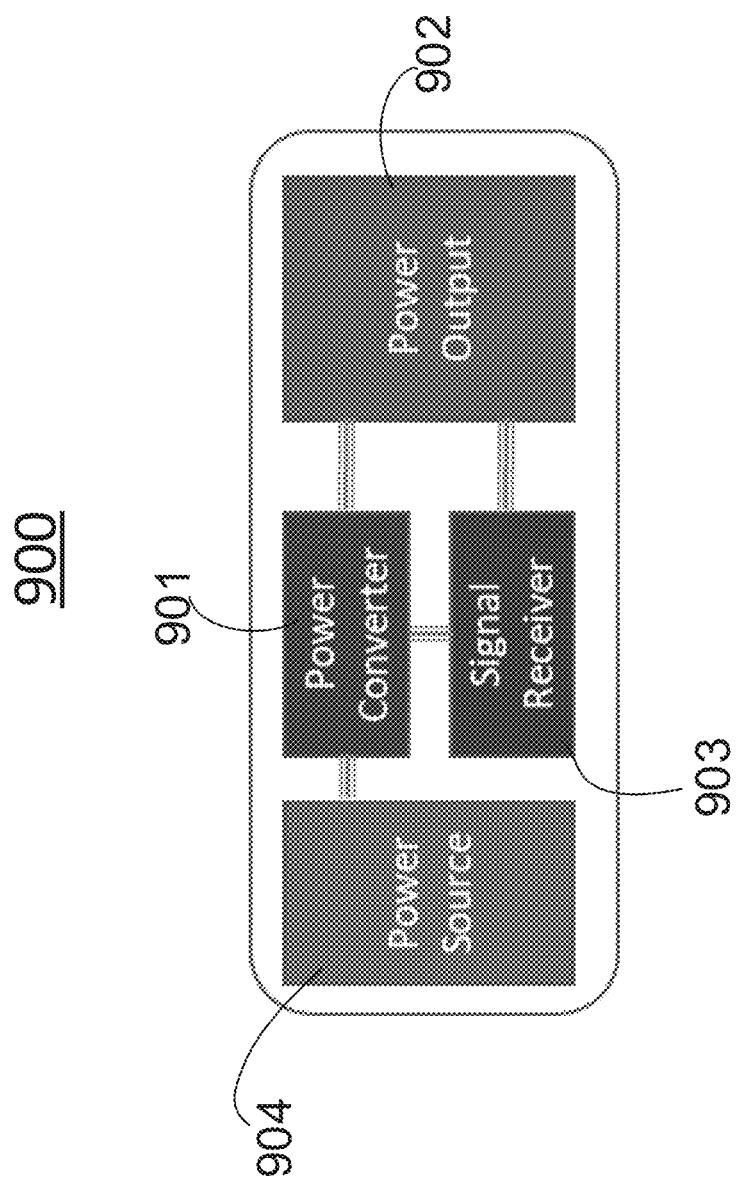
FIG. 9 is a graphical presentation illustrating a self-contained and self-powered controller, consistent with exemplary embodiments of the present disclosure.

FIG. 9 is a graphical presentation illustrating a self-contained and self-powered controller 900, consistent with exemplary embodiments of the present disclosure. As shown in FIG. 9, the controller 900 may include a power converter 901, a power output control 902, a signal receiver 903 and a power source 904. The power converter 901 may convert input power from the power source 904 to the power required by the signal receiver 903 and the power output control 902. The power source 904 may be integrated with the controller 900 (either inside or outside), and can be an energy storage, e.g. a battery, or an energy generator, e.g. a solar cell. The power output control 902 may be configured to supply power to the electrochromic film 103. Since the state of the electrochromic film 103 is driven by electric charges, the power output control 902 can inject into or extract a certain amount of electric charges from the electrochromic film 103 upon signals the signal receiver 903 receives, in order to change the state of the electrochromic film 103. The signal receiver 903 may be configured to receive signals sent to the controller 105, and transfer the signals to the power output control 902.

In some embodiments, an energy storage, such as a battery, can be used as the power source 904 to supply the power to the controller 900. Generally, lifetime of a battery could reach 10 years. The battery could be switched to a new battery to keep driving the electrochromic film in a smart window during maintenance.

Figure 10:
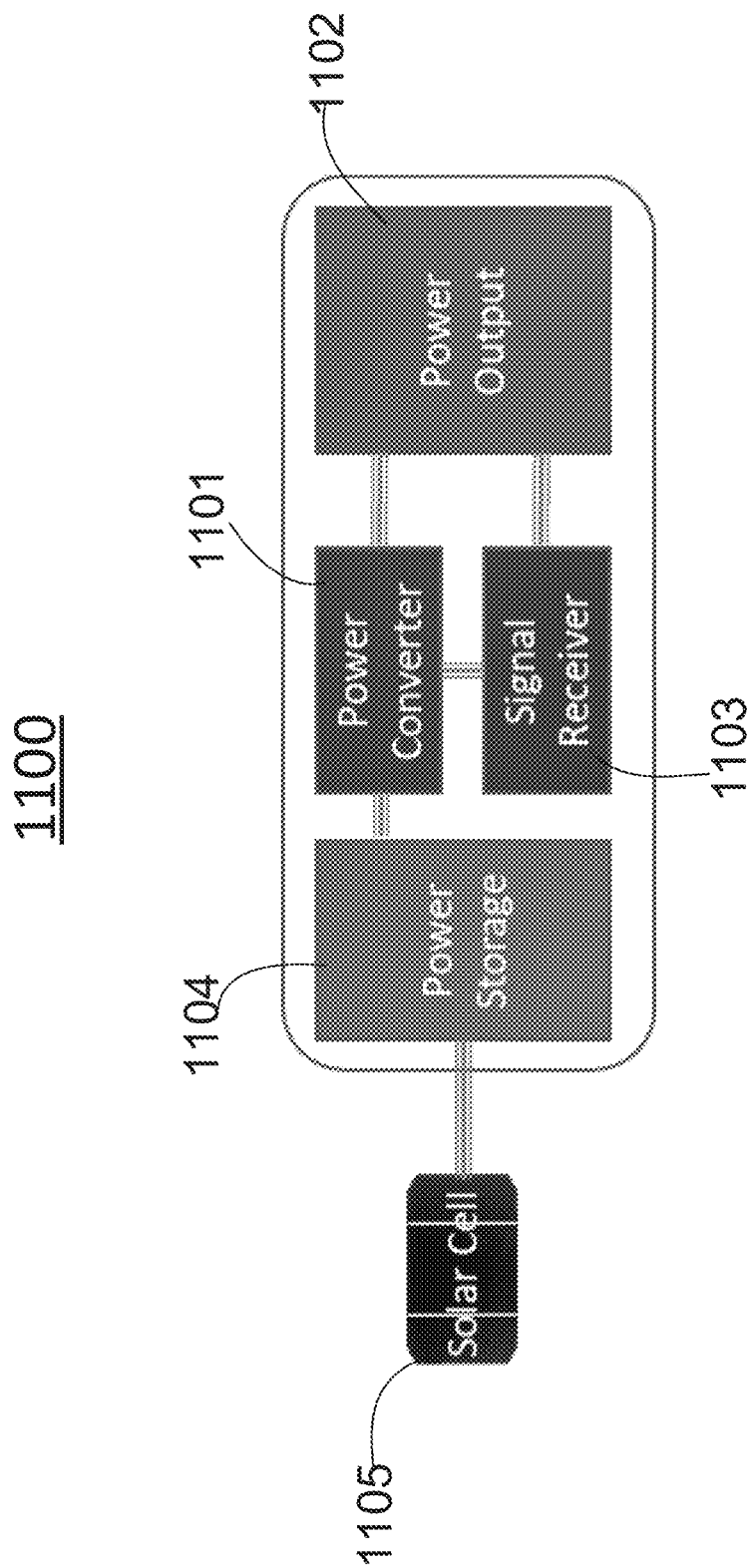
FIG. 10 is a graphical presentation illustrating a self-contained and self-powered controller with a solar cell, consistent with exemplary embodiments of the present disclosure.

In some embodiments, an energy generator, such as a solar cell, can be used as the power source to supply the power to the controller. FIG. 10 is a graphical presentation illustrating a self-contained and self-powered controller 1100 with a solar cell, consistent with exemplary embodiments of the present disclosure. As shown in FIG. 10, the controller 1100 may include a power converter 1101, a power output control 1102, a signal receiver 1103, a power storage unit 1104 and a solar cell 1105. The power converter 1101 may convert input power from the power storage unit 1104 to the power required by the signal receiver 1103 and the power output control 1102. The power storage unit 1104 may be an energy storage, e.g. a battery or a capacitor. The power output control 1102 may be configured to supply power to the electrochromic film. Since the state of the electrochromic film is driven by electric charges, the power output control 1102 can inject into or extract a certain amount of electric charges from the electrochromic film upon signals the signal receiver 1103 receives, in order to change the state of the electrochromic film. The signal receiver 1103 may be configured to receive signals sent to the controller 1100, and transfer the signals to the power output control 1102.

The solar cell 1105 may be configured to convert solar energy to electric energy and charge the power storage unit 1104, such as a battery or a capacitor in the controller. During an operation of the electrochromic film in a smart window, the controller 1100 may drains the energy from the power storage unit 1104. Solar energy can be first converted to electric energy when light is available. The converted electric energy may be stored into the power storage unit 1104. The stored energy is supplied to the controller 1100 to operate the electrochromic film. The solar cell 1105 may not directly supply energy to the controller 1100 during operation of the electrochromic film, thus avoiding the scenario that the optical states of an electrochromic film cannot be changed during cloudy or rainy days.

As the solar cell is configured to convert solar energy to electric energy, the solar cell need to be facing to the light source. In some embodiments, the light source may be the sun. Thus, the solar cell need to be placed on the outer surface of a smart window, facing the sun. In some embodiments, the light source may be indoor lighting. Thus, the solar cell need to be placed on the inner surface of a smart window, facing the indoor lighting.

Figure 11:
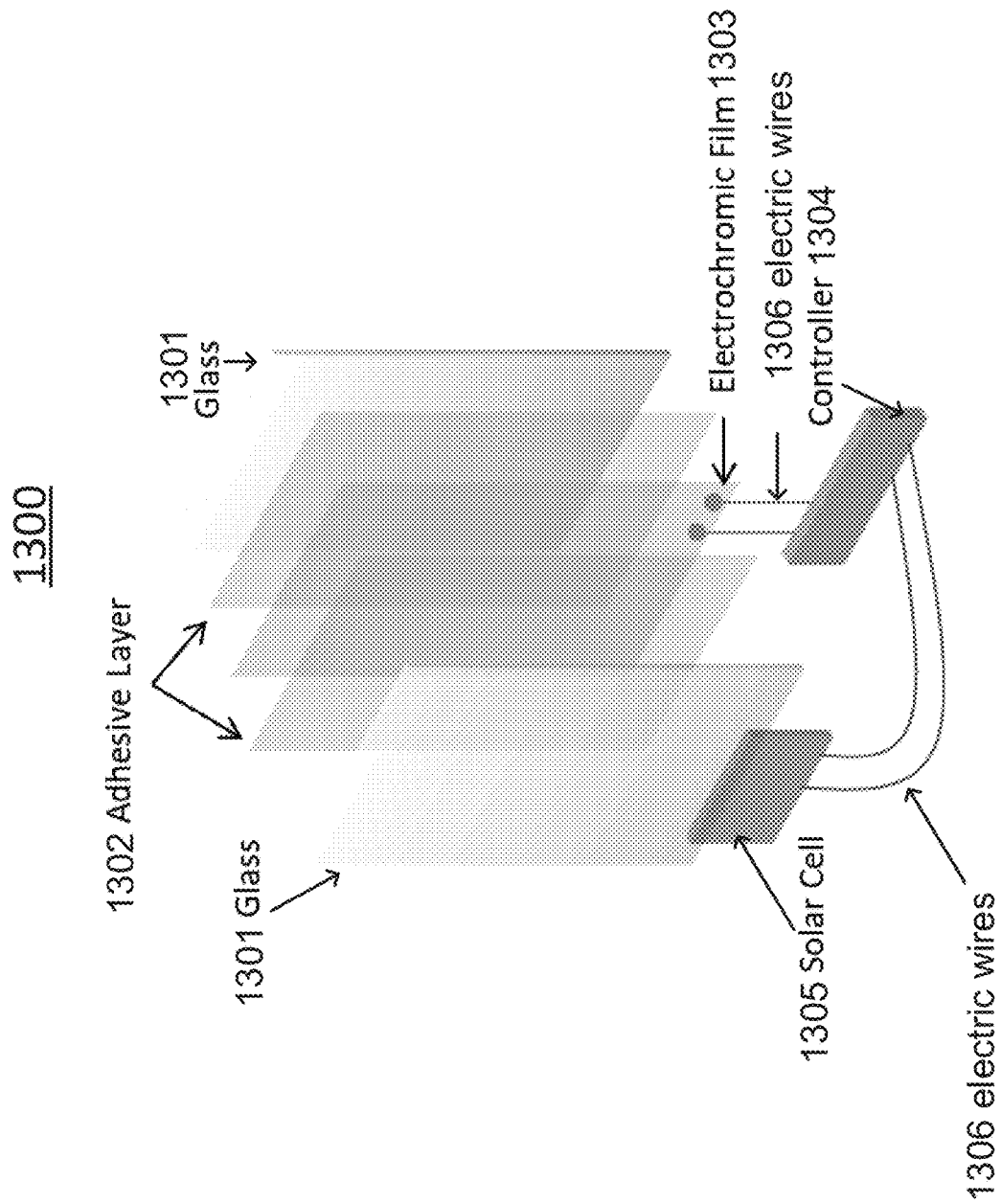
FIG. 11 is a graphical illustration showing a simplified schematic of a smart window with an integrated solar cell, consistent with exemplary embodiments of the present disclosure.

FIG. 11 is a graphical illustration showing a simplified schematic of a smart window 1300 with an integrated solar cell, consistent with exemplary embodiments of the present disclosure. The smart window 1300 may include two layers of glass 1301, two adhesive layers 1302, an electrochromic film 1303, a controller 1304, a solar cell 1305, and a plurality of electric wires 1306.

The electrochromic film 1303 is sandwiched between the two layers of glass 1301. The adhesive layers 1302 are configured to attached the electrochromic film 1303 to the layers of glass 1301. The controller 1304 may be placed outside the glass 1301, and is electrically connected with the electrochromic film 1303 with electric wires 1306. The controller 1303 may be configured to control the state of the smart window 1300 by controlling the states of the electrochromic film 1303. The solar cell 1305 may be placed on an outer surface of glass 1301, and is electrically connected to the controller 1304 with electric wires 1306. The solar cell 1305 is configured to convert solar energy to electric energy and supply the converted energy to the controller 1304.

In some embodiments, wireless charging may be used to provide energy to the electrochromic films in electrochromic devices. Wireless charging, also known as inductive charging, uses electromagnetic fields to transfer power from a transmitting source to a receiving device through electromagnetic induction. The transmitting source may use a first induction coil to create an alternating electromagnetic field. The receiving device may use a second induction coil to receive power from the electromagnetic field and convert it into electric energy. The transferred energy then can be used to operate the device. With wireless charging, wiring in the device and installation may be reduced and simplified.

Figure 12:
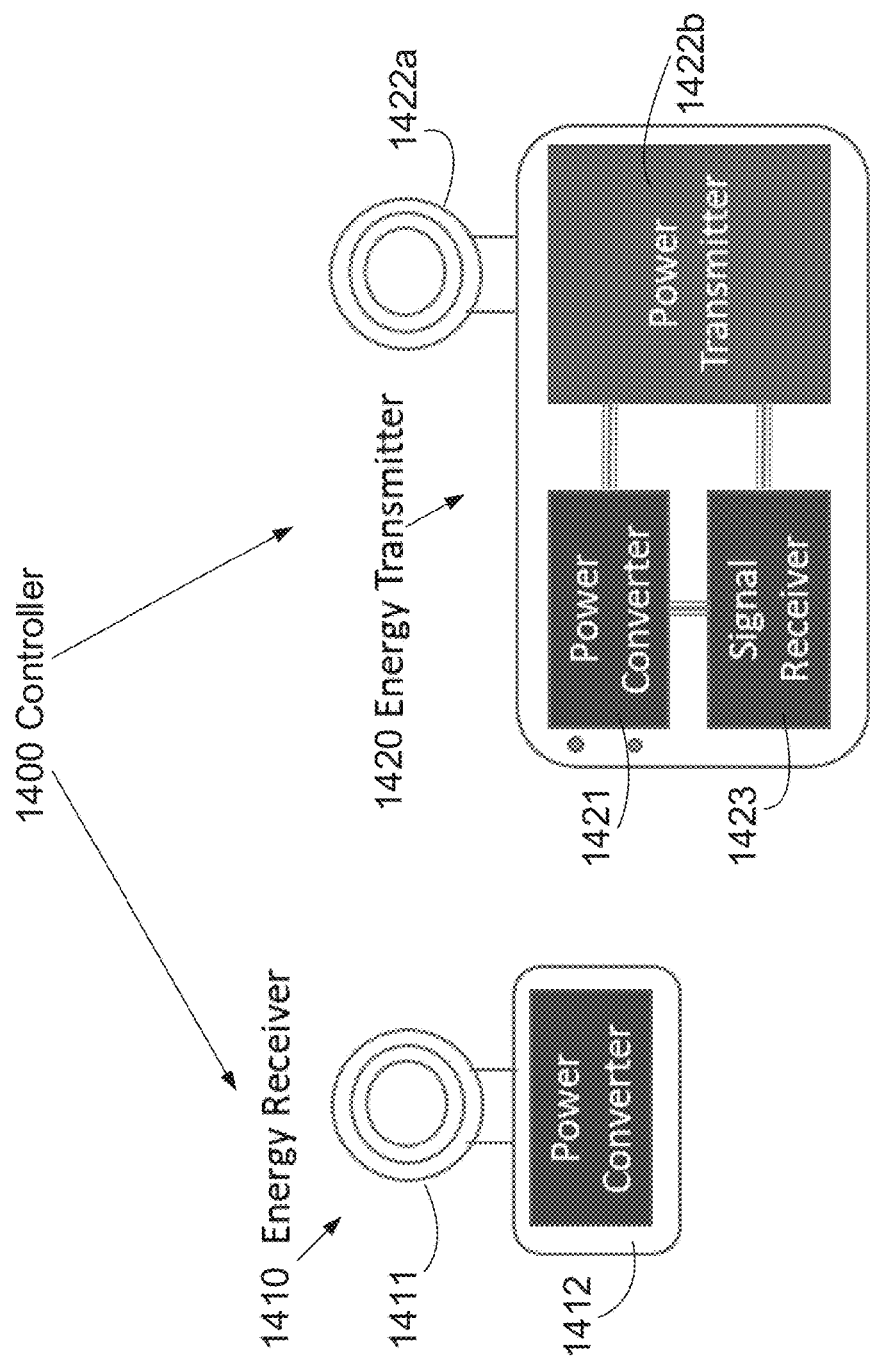
FIG. 12 is a graphical presentation illustrating a wireless charging controller 1400 with an energy receiver and an energy transmitter, consistent with exemplary embodiments of the present disclosure.

FIG. 12 is a graphical presentation illustrating a wireless charging controller 1400 with an energy receiver 1410 and an energy transmitter 1420, consistent with exemplary embodiments of the present disclosure. The wireless charging controller 1400 may include an energy receiver 1410 and an energy transmitter 1420.

The energy receiver 1410 may include a first induction coil 1411 and a power converter 1412. The first induction coil 1411 may be configured to receive electromagnetic energy wirelessly transferred from the energy transmitter 1420. The power converter 1412 may be configured to convert the received electromagnetic energy (AC) to DC power and output it to the electrochromic films in the electrochromic devices. The energy receiver 1410 may be attached to the electrochromic film and viewed as part of the electrochromic film during installation. The energy receiver 1410 may be integrated into the glass.

Figure 13:
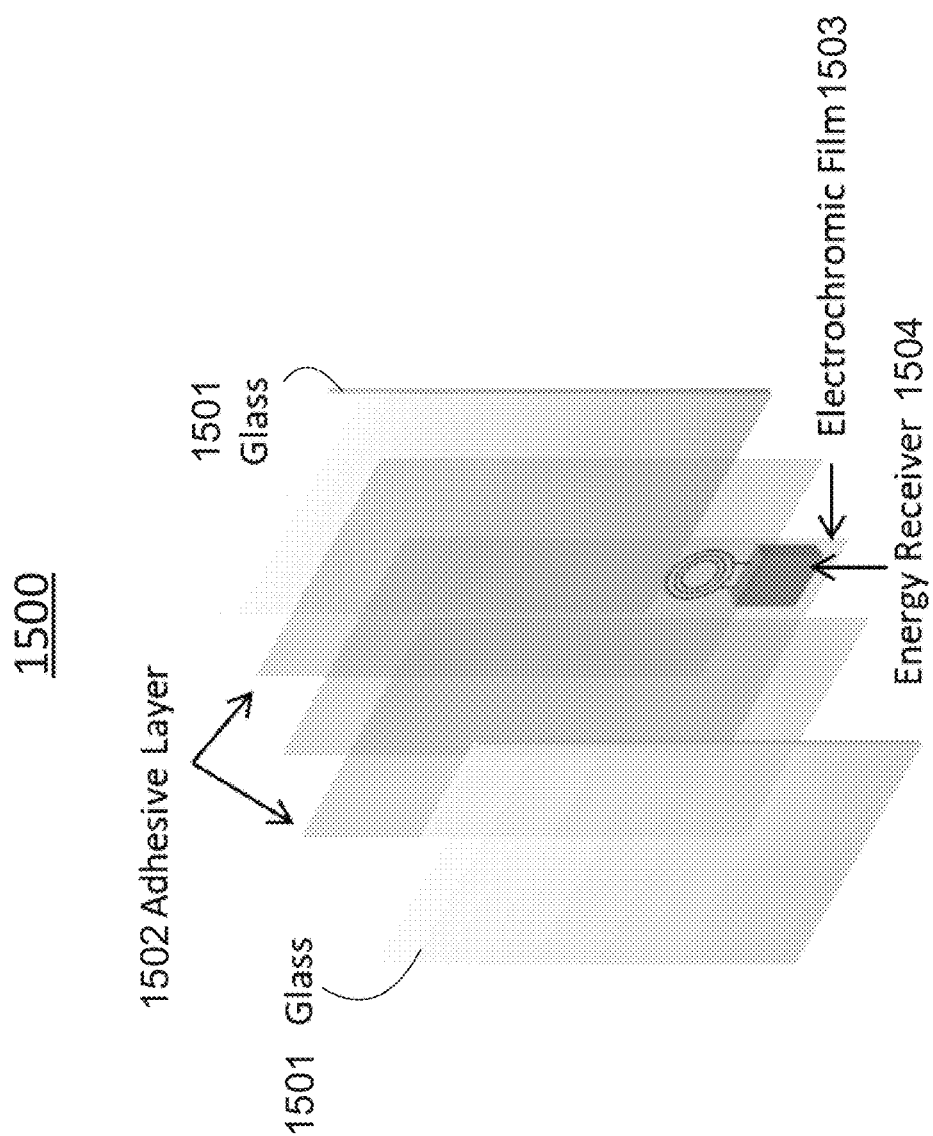
FIG. 13 is a graphical illustration showing a simplified schematic of a smart window with an energy receiver, consistent with exemplary embodiments of the present disclosure.

An exemplary integration of a smart window 1500 is shown in FIG. 13. The electrochromic film 1503 and the energy receiver 1504 are laminated between two layers of glass 1501. As a result, there is no protruding wires coming from inside of the glass to the outside. Both the electrochromic film 1503 and the energy receiver 1504 are embedded inside the glass unit 1501, simplifying the glazing installation. The electrochromic film integration methods could be applied to the integration of the electrochromic films with energy receiver, the details are presented in patent application U.S. Ser. No. 15/399,852, which is incorporated herein by reference. In some embodiments, the energy receiver may be installed outside the glass, either embedded inside the window frame or installed outside the window.

The energy transmitter 1420 may include a power converter 1421, a second induction coil 1422a, a power transmitter 1422b and a signal receiver 1423, as shown in FIG. 12. A power converter is an electrical device for converting electric energy from one form to another such as converting between AC (alternative current) and DC (direct current); or converting to different voltage or frequency; or some combination of these. A power transmitter in general may include electronic circuits configured to transmit electricity or energy from a power source to an electrical load. For example, the power transmitter may be a conventional power transmitter available in the market, and may include an electronic oscillator circuit to generate signals, a modulator circuit to modulate signals to be transmitted, an amplifier to increase the power of the signals, and an impedance matching circuit to match the impedance of the transmitter to the impedance of the receiver, and other circuits. The power converter 1421 may be configured to convert external power to the power required by the power transmitter 1422b and the signal receiver 1423. The power transmitter 1422b and the second induction coil 1422a may be configured to wirelessly transfer electromagnetic energy to an energy receiver of an electrochromic device. The signal receiver 1423 may be configured to receive signals to change the electrochromic film to a specific state.

Figure 14:
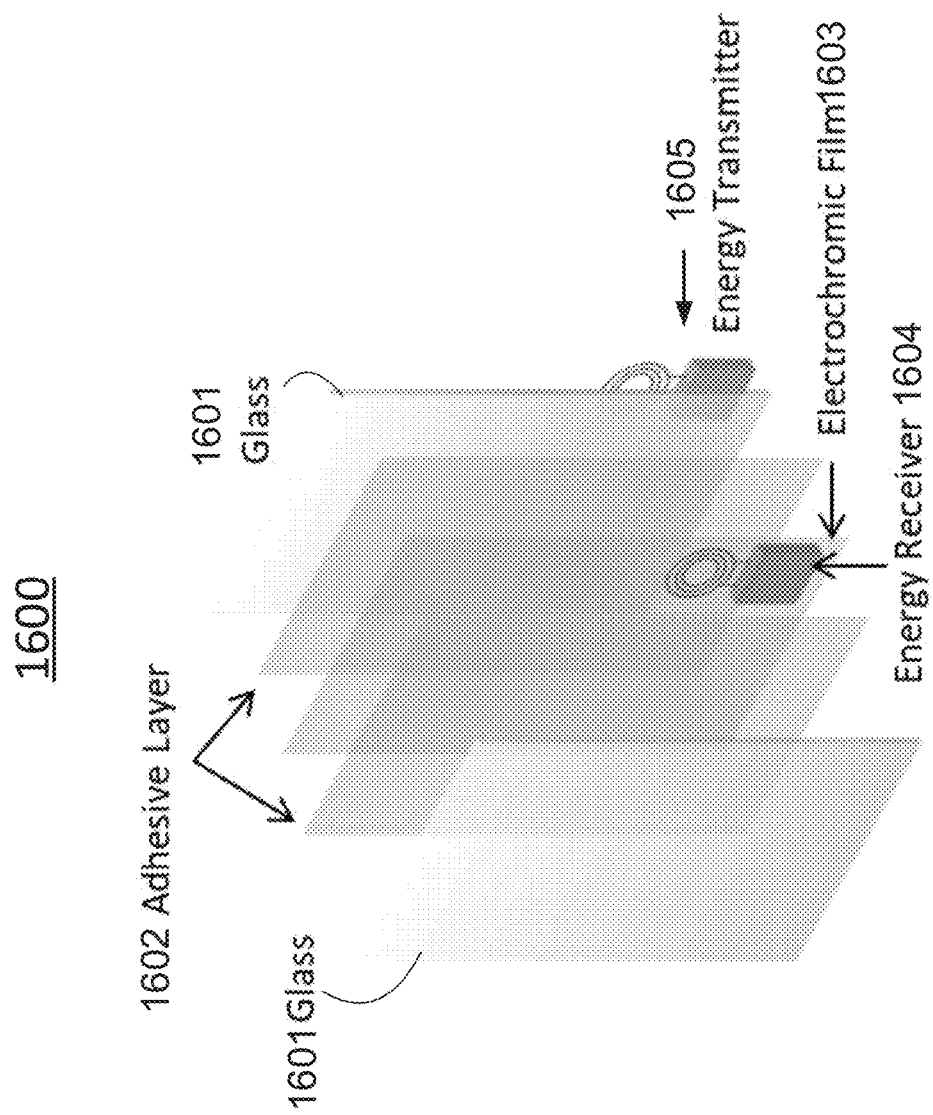
FIG. 14 is graphical illustration showing a simplified schematic of a smart window with an energy receiver and an energy transmitter, consistent with exemplary embodiments of the present disclosure.

An exemplary integration of a smart window 1600 is shown in FIG. 14. The energy transmitter 1605 may be configured to be placed outside a smart window 1600. For example, after the smart window is installed, the energy transmitter 1605 could be simply attached to the outside of the glass to control the device. In some embodiments, the energy transmitter 1605 may use power of a building where the smart window is installed to supply the power to itself.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An electrochromic system, comprising:
   one or more electrochromic devices, each electrochromic device comprising:
   two glass layers;
   two adhesive layers disposed on inner surfaces of the two glass layers;
   an electrochromic film disposed between the two adhesive layers, the electrochromic film including an electrochromic material layer, a solid polymer electrolyte, and a charge storage layer, wherein the solid polymer electrolyte includes at least one electrolyte salt selected from the group consisting of: LiTFSI, $LiPF_6$, $LiBF_4$, $LiClO_4$, $LiCF_3SO_3$, $LiN(CF_3SO_2)$, $LiSbFg$, $LiAsF_6$, $LiN(CF_3CF_2SO_2)_2$, $(C_2H_5)_4NBF_4$, $(C_2H_5)_3CH_3NBF_4$, LiI, and combinations thereof;
   a controller including a power converter, a signal receiver, and a power output, the power converter configured to receive power from a power source, the signal receiver configured to receive a control signal, and the power output coupled to the electrochromic film and configured to provide power to the electrochromic film to control optical state of the electrochromic film, wherein the power source is integrated with the controller, and includes an energy storage; and
   a control device configured to send the control signal to the signal receiver, and
   a central control device configured to globally control optical states of all of the one or more electrochromic devices.

2. The electrochromic system of claim 1, further comprising a solar cell configured to convert solar energy to electric energy to charge the power source.

3. The electrochromic system of claim 1, further comprising:
   an energy receiver which includes a power converter and a first induction coil; and
   an energy transmitter which includes a power transmitter and a second induction coil,
   wherein the energy transmitter is configured to wirelessly transfer electromagnetic energy to the energy receiver, and the energy receiver is configured to receive the electromagnetic energy wirelessly, convert the electromagnetic energy to DC power, and output the DC power to the electrochromic film to control optical state of the electrochromic film.

4. The electrochromic system of claim 1, wherein the solid polymer electrolyte further comprises a polymer framework, and at least one solid plasticizer.

5. The electrochromic system of claim 4, wherein the at least one solid plasticizer comprises an oligomeric polymer material substantially miscible with the polymer framework.

6. The electrochromic system of claim 1, wherein the signal receiver includes a wireless receiver, and each control device and the central control device includes a wireless transmitter, wherein the wireless receiver and transmitter are configured to communicate through radio frequency, optical waves or sound waves, wherein the radio frequency includes Bluetooth, Wi-Fi, Z-Wave, ZigBee, and the optical waves include infrared light.

7. An electrochromic system comprising:
one or more electrochromic devices, each electrochromic device comprising:
two glass layers;
two adhesive layers disposed on inner surfaces of the two glass layers;
an electrochromic film disposed between the two adhesive layers, the electrochromic film including an electrochromic material layer, a solid polymer electrolyte, and a charge storage layer, wherein the solid polymer electrolyte includes at least one electrolyte salt selected from the group consisting of: LiTFSI, LiPF$_6$, LiBF$_4$, LiClO$_4$, LiCF$_3$SO$_3$, LiN(CF$_3$SO$_2$), LiSbFg, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, LiI, and combinations thereof;
a controller including a power converter, a signal receiver, and a power output, the power converter configured to receive power from a power source, the signal receiver configured to receive a control signal, and the power output coupled to the electrochromic film and configured to provide power to the electrochromic film to control optical state of the electrochromic film, wherein the power source is integrated with the controller, and includes an energy storage; and
a wireless control device configured to send the control signal to the signal receiver through wireless communication, and
a wireless central control device configured to globally control optical states of all of the one or more electrochromic devices through wireless communication.

8. The electrochromic system of claim 7, wherein the controller includes a ZigBee receiver configured receive control signals to control optical state of the electrochromic film.

9. The electrochromic system of claim 8, further comprising one or more ZigBee coordinators, each ZigBee coordinator configured to communicate with one or more of the ZigBee receivers.

10. The electrochromic system of claim 9, further comprising a ZigBee gateway configured to communicate with the ZigBee coordinators and be connected to the Internet.

11. The electrochromic system of claim 7, further comprising a solar cell configured to convert solar energy to electric energy and charge the power source.

12. The electrochromic system of claim 7, further comprising:
an energy receiver which includes a power converter and a first induction coil; and
an energy transmitter which includes a power transmitter and a second induction coil,
wherein the energy transmitter is configured to wirelessly transfer electromagnetic energy to the energy receiver, and the energy receiver is configured to receive the electromagnetic energy wirelessly, convert the electromagnetic energy to DC power, and output the DC power to the electrochromic film to control optical state of the electrochromic film.

13. An electrochromic device, comprising:
two glass layers;
two adhesive layers disposed on inner surfaces of the two glass layers;
an electrochromic film disposed between the two adhesive layers, the electrochromic film including an electrochromic material layer, a solid polymer electrolyte, and a charge storage layer, wherein the solid polymer electrolyte includes at least one electrolyte salt selected from the group consisting of: LiTFSI, LiPF$_6$, LiBF$_4$, LiClO$_4$, LiCF$_3$SO$_3$, LiN(CF$_3$SO$_2$), LiSbFg, LiAsF$_6$, LiN(CF$_3$CF$_2$SO$_2$), (C$_2$H$_5$)$_4$NBF$_4$, (C$_2$H$_5$)$_3$CH$_3$NBF$_4$, LiI, and combinations thereof;
a controller including a power converter, a signal receiver, and a power output, the power converter configured to receive power from a power source, the signal receiver configured to receive a control signal, and the power output coupled to the electrochromic film and configured to provide power to the electrochromic film to control optical state of the electrochromic film, wherein the power source is integrated with the controller, and includes an energy storage; and
an external switch configured to send the control signal to the signal receiver.

14. The electrochromic device of claim 13, further comprising a solar cell configured to convert solar energy to electric energy and charge the power source.

15. The electrochromic device of claim 13, further comprising:
an energy receiver which includes a power converter and a first induction coil; and
an energy transmitter which includes a power transmitter and a second induction coil,
wherein the energy transmitter is configured to wirelessly transfer electromagnetic energy to the energy receiver, and the energy receiver is configured to receive the electromagnetic energy wirelessly, convert the electromagnetic energy to DC power, and output the DC power to the electrochromic film to control optical state of the electrochromic film.

16. The electrochromic device of claim 13, wherein the solid polymer electrolyte further comprises a polymer framework, and at least one solid plasticizer.

17. The electrochromic device of claim 16, wherein the at least one solid plasticizer comprises an oligomeric polymer material substantially miscible with the polymer framework.

18. The electrochromic device of claim 13, wherein the signal receiver includes a wireless receiver, and each control device and the central control device includes a wireless transmitter, wherein the wireless receiver and transmitter are configured to communicate through radio frequency, optical waves, or sound waves, wherein the radio frequency includes Bluetooth, Wi-Fi, Z-Wave, ZigBee, and the optical waves include infrared light.

* * * * *

UNITED STATES PATENT AND TRADEMARK OFFICE
CERTIFICATE OF CORRECTION

| | | |
|---|---|---|
| PATENT NO. | : 10,459,308 B2 | Page 1 of 1 |
| APPLICATION NO. | : 15/882443 | |
| DATED | : October 29, 2019 | |
| INVENTOR(S) | : Jian Wang and Yan Zhou | |

It is certified that error appears in the above-identified patent and that said Letters Patent is hereby corrected as shown below:

In the Claims

Column 18, Claim 13, Line 16 delete "LiN(CF$_3$CF$_2$SO$_2$)" and insert --LiN(CF$_3$CF$_2$SO$_2$)$_2$--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*